T. E. MURRAY.
METHOD OF ELECTRIC WELDING.
APPLICATION FILED JAN. 24, 1917.
1,220,776.
Patented Mar. 27, 1917.
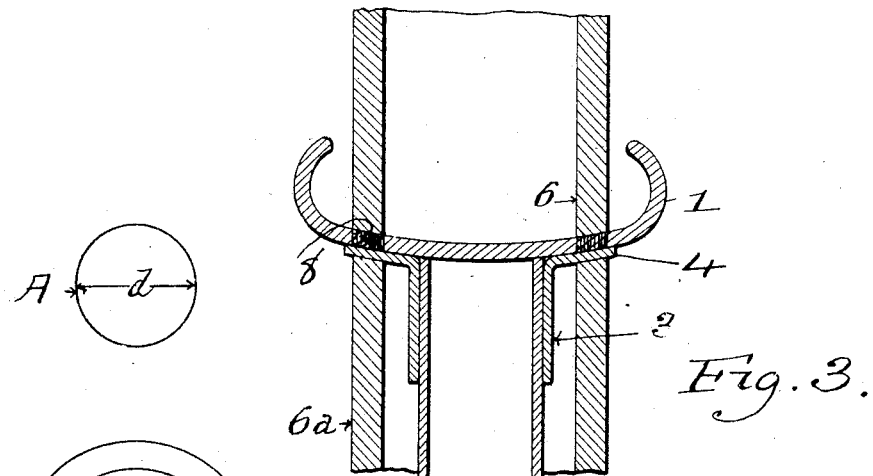
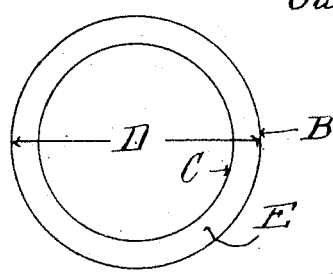
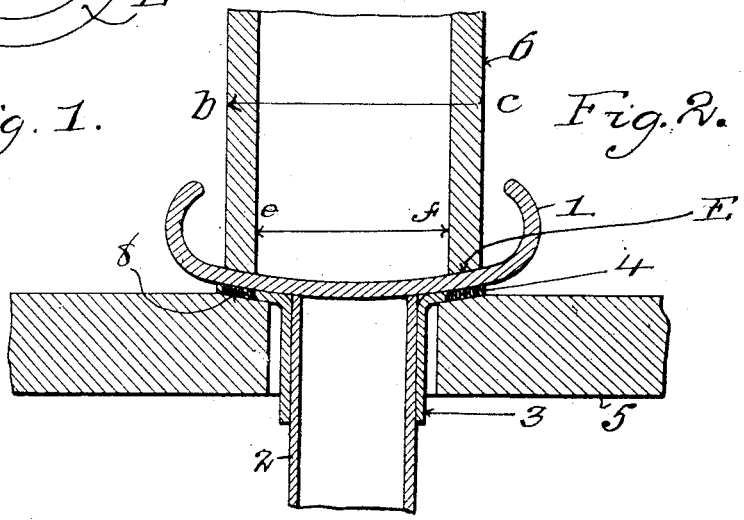
INVENTOR
Thomas E. Murray
BY Park Benjamin
ATTORNEY

UNITED STATES PATENT OFFICE.

THOMAS E. MURRAY, OF NEW YORK, N. Y.

METHOD OF ELECTRIC WELDING.

1,220,776.          Specification of Letters Patent.     Patented Mar. 27, 1917.

Application filed January 24, 1917. Serial No. 144,134.

*To all whom it may concern:*

Be it known that I, THOMAS E. MURRAY, a citizen of the United States, residing at New York, in the county of New York and State of New York, have invented a certain new and useful Improvement in Methods of Electric Welding, of which the following is a specification.

The invention is a method of producing electrical spot welds.

I have discovered that when a welding electrode has a flat face everywhere in contact with a body to be welded, most of the current traverses that portion of the face which is near to its bounding circumference, and comparatively little of said current traverses the central portion of said face. Hence it happens that before a welding heat is reached at said central portion, the circumferential portion becomes burned, or when a welding heat is reached at the circumferential portion it is not reached at the central portion, and an imperfect joint results. In neither of the above cases is it possible to forecast what the actual strength of the joint will be.

I have also found that where two bodies— such as plates—are united by a spot weld, such as set forth in U. S. Letters Patent No. 1,046,066 to J. Harmatta, December 3, 1912—that is to say, "a small sharply defined place of welding at the spot desired which perfectly answers the purpose of a rivet"—the plates can be torn asunder with comparative ease, the metal breaking around the rivet-shaped weld. I have further found that this difficulty can be reduced by departing radically from the Harmatta weld—to wit, "a small sharply defined place of welding"—and by providing a much more extended welding area, and that when this is done, the larger the circumference of that area becomes, the less becomes the tendency of the plate or sheet to tear.

But to increase the circumference is to invite the difficulty of irregular distribution of the current, already noted. The problem which I have had before me then, is how to reconcile the advantages of circumferentially increased area, with the disadvantages of irregular current distribution. I solve this problem in the following way.

In the accompanying drawings—

Figure 1 illustrates diagrammatically the mode of forming an electrode face for producing spot welds in accordance with my method. Fig. 2 is a transverse section of a metal wheel rim and a plate electrode, and a longitudinal section of the wheel spoke, ferrule, and the opposite tubular electrode. Fig. 3 is the same, with a tubular electrode substituted for the plate electrode.

Similar letters and numbers of reference indicate like parts.

Let the circle A, Fig. 1, represent an electrode face, of such area as will produce a weld of some predetermined strength between two sheets of metal. Assume that although this joint may, in and of itself, be of the full strength desired, nevertheless the sheets united by said joint may be too readily torn apart, the rupture occurring around the joint. Let the circle B represent an electrode face of larger area which will produce a welded joint around which, under the same conditions of applied strain, the sheets are not torn apart, and assume further that in the existing circumstances, the face of the electrode cannot be of greater area than circle B. Hence the conditions require that the diameter of circle B must be kept constant, while the welding area of the electrode must be equal to that of circle A, because in the first case we obtain the greatest immunity from tearing apart of the sheets, and in the second, we obtain a joint of the selected strength.

If the diameter of circle B be represented by D, and the diameter of circle A by $d$, then the expression $$\sqrt{D^2 - d^2}$$

will give the diameter of a circle C, which I inscribe within and concentric with circle B. This done, the annular area E between circle C and circle B will have the same area as circle A, and an electrode having such an annular face will give a weld as strong as that produced by an electrode having a face represented by circle A, as free from tearing weakness as a face represented by circle B, and, because the whole effective area is close to the circumference, free also from the irregular distribution of the current between central and circumferential portions of the electrode face.

In practice, I form the circular electrode face of a certain diameter, corresponding to diameter D of circle B. I ascertain the diameter of a joint of sufficient strength—that is, diameter $d$ of circle A. I find from these factors, as above described, the diameter of circle C, and I form in the face of the electrode, a circular recess of said diameter. The circular rib thus formed between the recess in and the circumference of the face then confines the welding current, while traversing the bodies to be welded, to a path substantially annular in cross section, having the diameter of circle B and the cross sectional area of circle A.

In this way, as I have now demonstrated by long and careful experimenting, I attain the best conditions for making an isolated or spot weld.

I have explained the foregoing with reference to circular electrodes for the sake of simplicity, but it will be obvious that said electrodes may be of any closed figure—as, for example, polygonal, or even irregular in shape. The invention is applicable to a great variety of uses. I illustrate one, namely, the welding of the flanged spoke ferrule of a metal wheel to the rim. Here, 1 is the rim, 2 a tubular spoke, and 3 the ferrule secured on the end of the spoke and having a flange 4. The object is to weld the flange to the under side of the rim. 5, Fig. 1, is a plate electrode, preferably of copper, having an opening in which the spoke is placed, with the ferrule flange 4 lapping over the upper face of said electrode. 6 is an electrode, also preferably of copper, and here in tubular form. The rim 1 being placed upon the flange 4, the electrode 6 is pressed down upon said rim, and the welding current passes in the annular form already described, and as indicated at 8. In this case, the outer diameter $b$, $c$ of electrode 6 would represent the circle B, and its inner diameter $e$, $f$ the circle C. The area of the annular face E of the tube would correspond to that of the predetermined circle A.

There may be cases where it is desirable to confine the welding current more closely to an annular path in traversing the objects to be welded. In such event, it is preferable to make both electrodes 6, 6ª annular and of like face dimensions, as shown in Fig. 2.

I claim:

1. The method of constructing a welding electrode, which consists in determining an electrode surface of selected area and configuration, determining an electrode surface of enlarged area and similar but correspondingly enlarged configuration, determining the surface area of an endless band which shall be equal to said first-named area but shall have said similar but correspondingly enlarged configuration, and forming on the surface of said electrode a projection or rib having its welding face conforming in area and configuration to said endless band.

2. The method of constructing a welding electrode, which consists in determining a circular electrode area A of predetermined diameter $d$; determining a larger circular electrode area B of predetermined diameter D; determining a circular area whereof the diameter is $$\sqrt{D^2-d^2},$$

and forming said electrode with a circular contact face having the diameter D and a central recess in said face having the diameter $$\sqrt{D^2-d^2}.$$

In testimony whereof I have affixed my signature in presence of two witnesses.

THOMAS E. MURRAY.

Witnesses:
GERTRUDE T. PORTER,
MAY T. McGARRY.